(12) United States Patent
Cheong et al.

(10) Patent No.: US 9,046,632 B2
(45) Date of Patent: Jun. 2, 2015

(54) LIGHT GUIDE PLATE AND DISPLAY APPARATUS HAVING THE SAME

(75) Inventors: Byoungho Cheong, Yongin-si (KR); Oleg Prudnikov, Suwon-si (KR); Guk Hyun Kim, Hwaseong-si (KR); Hyundeok Im, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 315 days.

(21) Appl. No.: 13/601,690

(22) Filed: Aug. 31, 2012

(65) Prior Publication Data

US 2013/0235613 A1 Sep. 12, 2013

(30) Foreign Application Priority Data

Mar. 12, 2012 (KR) ........................ 10-2012-0025156

(51) Int. Cl.
F21V 5/02 (2006.01)
F21V 8/00 (2006.01)

(52) U.S. Cl.
CPC ............ *G02B 6/0038* (2013.01); *G02B 6/0046* (2013.01); *G02B 6/0055* (2013.01); *G02B 6/0068* (2013.01)

(58) Field of Classification Search
None
See application file for complete search history.

(56) References Cited

U.S. PATENT DOCUMENTS

| 5,724,108 | A | * | 3/1998 | Shibata | 349/62 |
| 2005/0099822 | A1 | * | 5/2005 | Choi et al. | 362/561 |
| 2008/0297699 | A1 | * | 12/2008 | Shimazaki et al. | 349/67 |
| 2009/0207341 | A1 | * | 8/2009 | Shinkai et al. | 349/65 |
| 2009/0207344 | A1 | * | 8/2009 | Ono et al. | 349/65 |
| 2009/0262420 | A1 | * | 10/2009 | Yun et al. | 359/463 |
| 2010/0328581 | A1 | * | 12/2010 | Shiraishi et al. | 349/65 |
| 2011/0038177 | A1 | | 2/2011 | Kuwayama | |
| 2011/0188265 | A1 | * | 8/2011 | Kumasawa et al. | 362/611 |
| 2011/0304784 | A1 | * | 12/2011 | Hirota et al. | 349/15 |
| 2012/0195063 | A1 | | 8/2012 | Kim et al. | |
| 2013/0194823 | A1 | * | 8/2013 | Yagi et al. | 362/607 |

FOREIGN PATENT DOCUMENTS

| KR | 1020030082828 | 10/2003 |
| KR | 1020110010279 | 2/2011 |
| KR | 1020120088121 | 8/2012 |

* cited by examiner

*Primary Examiner* — Ashok Patel
(74) *Attorney, Agent, or Firm* — H.C. Park & Associates, PLC

(57) ABSTRACT

In a light guide plate and a display apparatus having the light guide plate, a light guide plate includes reflective prisms, in which at least one of the reflective prisms includes an inclined angle adjustable according to an inclined surface of a defective portion thereof and compensates for a distortion of light caused by the defective portion.

22 Claims, 17 Drawing Sheets

LIGHT GUIDE PLATE AND DISPLAY APPARATUS HAVING THE SAME

CROSS-REFERENCE TO RELATED APPLICATION

This application claims priority from and benefit of Korean Patent Application No. 10-2012-0025156, filed on Mar. 12, 2012, the contents of which are hereby incorporated by reference.

BACKGROUND

1. Field

The following description relates to a light guide plate and a display apparatus having the same. More particularly, the present disclosure relates to a light guide plate that guides light emitted from a light source to a display panel and a display apparatus having the light guide plate.

2. Discussion of the Background

In general, a liquid crystal display includes a display panel to display an image. Since the display panel is not a self-emissive device, the liquid crystal display may generally include a backlight unit to provide light to the display panel. The backlight unit may include a light source to emit a point light or a linear light and a light guide plate to convert the light from the light source to a surface light and guide the light to the display panel.

SUMMARY

The present disclosure provides a light guide plate capable of improving a display quality.

The present disclosure provides a display apparatus having the light guide plate.

Additional features of the invention will be set forth in the description which follows, and in part will be apparent from the description, or may be learned by practice of the invention.

Exemplary embodiments of the present invention provide a light guide plate includes a body including a first surface to which a light is incident, an opposite surface facing the first surface, an upper surface connecting the first surface and the opposite surface and configured to output the light, a lower surface facing the upper surface, and side surfaces connecting the first surface, a plurality of prisms disposed on an opposite surface, and a protruding portion disposed at an edge of an upper surface of the body, adjacent to the opposite surface and protruded upwardly from the upper surface.

Exemplary embodiments of the present invention provide a display apparatus includes the above-mentioned light guide plate thereof configured to guide a light, a light source configured to emit the light to the light guide plate, and a display panel configured to receive the light from the light guide plate to display an image.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
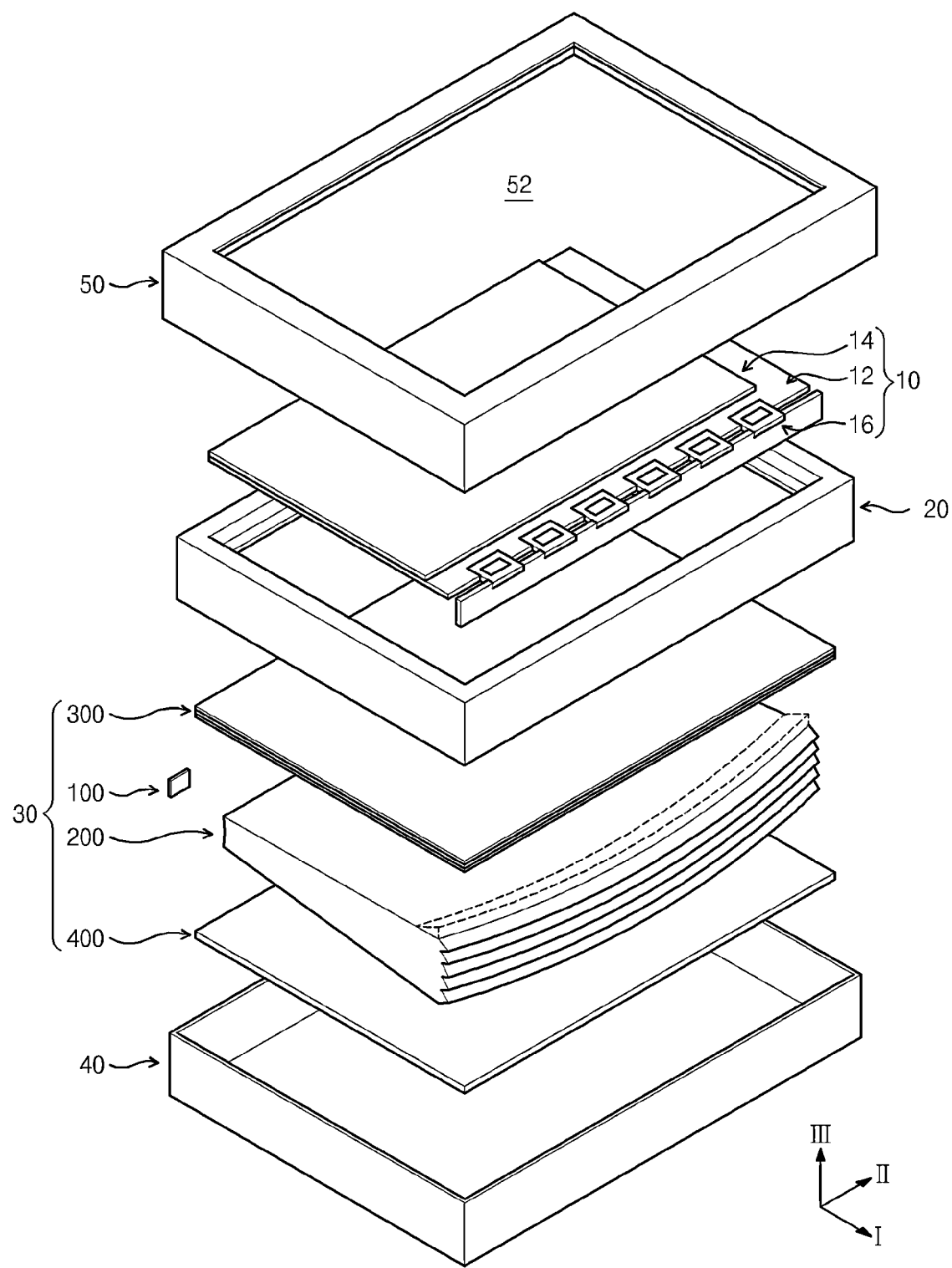
FIG. 1 is an exploded perspective view showing a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, and the like may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (i.e., rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings. In exemplary embodiments of the present invention, a liquid crystal display will be described as a representative example, but a display apparatus according to the exemplary embodiments of the present invention should not be limited to the liquid crystal display. That is, the display apparatus according to the exemplary embodiments may be, but not limited to, various non-emissive displays, such as an electrophoretic display, an electrowetting display, and the like.

FIG. 1 is an exploded perspective view showing a display apparatus according to an exemplary embodiment of the present invention.

Referring to FIG. 1, a display apparatus 1 may be, but not limited to, the liquid crystal display. The display apparatus 1 includes a display panel 10, a mold frame 20, a backlight unit 30, a bottom chassis 40, and a top chassis 50.

Hereinafter, a direction corresponding to a shorter side of the display panel 10 may be referred to as a first direction I, a direction corresponding to a longer side of the display panel 10 may be referred to as a second direction II, and a direction substantially perpendicular to the first direction I and the second direction II is referred to as a third direction III.

The display panel 10 displays an image. Referring to FIG. 1, the display panel 10 includes a thin film transistor substrate 12, a color filter substrate 14, a liquid crystal layer (not shown), and a panel driver 16. The color filter substrate 14 is disposed to overlap the thin film transistor substrate 12, and the liquid crystal layer is disposed between the thin film transistor substrate 12 and the color filter substrate 14.

The thin film transistor substrate 12 includes thin film transistors (not shown) and pixel electrodes (not shown). Each thin film transistor may be electrically connected to a corresponding pixel electrode of the pixel electrodes to switch a driving signal applied to the corresponding pixel electrode. The color filter substrate 14 includes a common electrode (not shown) that may generate an electric field in cooperation with the pixel electrodes. Due in part to the electric field, an arrangement of liquid crystal molecules in the liquid crystal layer may be controlled. The panel driver 16 makes contact with the thin film transistor substrate 12 and may apply a driving signal to gate lines (not shown) and data lines (not shown) disposed on the thin film transistor substrate 12.

A mold frame 20 may have a generally hollow rectangular shape and supports an edge of the display panel 10. The mold frame 20 may be formed in a single body as shown in FIG. 1, but may not be limited thereto. That is, the mold frame 20 may be configured to include some parts.

The backlight unit 30 is disposed under the display panel 10 and may provide the display panel 10 with light. The backlight unit 30 includes a light source 100, a light guide plate 200, an optical sheet 300, and a reflective sheet 400. The light source 100 may emit the light in the first direction I. The light guide plate 200 may be disposed to be spaced apart from the light source 100 in the first direction I. The light emitted from the light source 100 may be incident to the light guide plate 200 (hereinafter referred to as first incident light). The light guide plate 200 may convert the first incident light to a surface light and provide the converted surface light onto the optical sheet 300. The light exiting from the light guide plate 200 may be incident to the optical sheet 300 (hereinafter referred to as second incident light). The optical sheet 300 may diffuse the second incident light in the third direction III. The light exiting from the optical sheet 300 travels to the display panel 10. The reflective sheet 400 is disposed under the light guide plate 300 and may reflect the light leaked from the light guide plate 200 to the light guide plate 200.

The bottom chassis 40 is disposed under the backlight unit 30 and accommodates the backlight unit 30 therein. The top chassis 50 is disposed on the display panel 10 to support a front edge of the display panel 10. The top chassis 50 may cover a side surface of the mold frame 20 and a side surface of the bottom chassis 40. The top chassis 50 is provided with a display window 52 formed therethrough. A display area of the display panel 10 is exposed through the display window 52.

Figure 2:
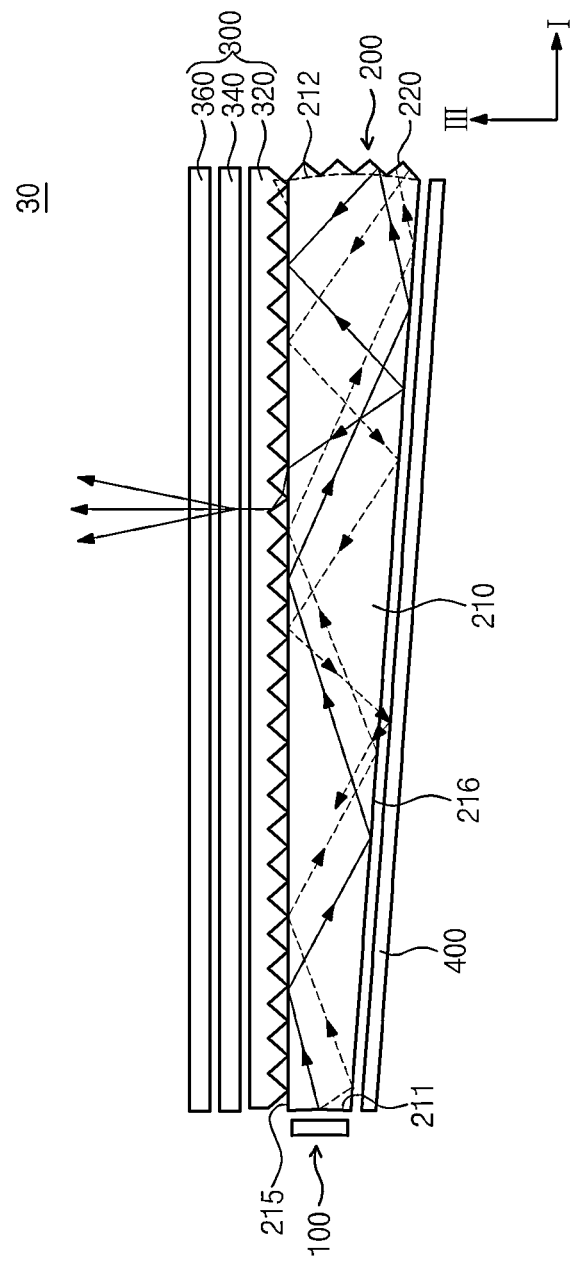
FIG. 2 is a sectional view showing a backlight unit shown in FIG. 1.
Figure 3:
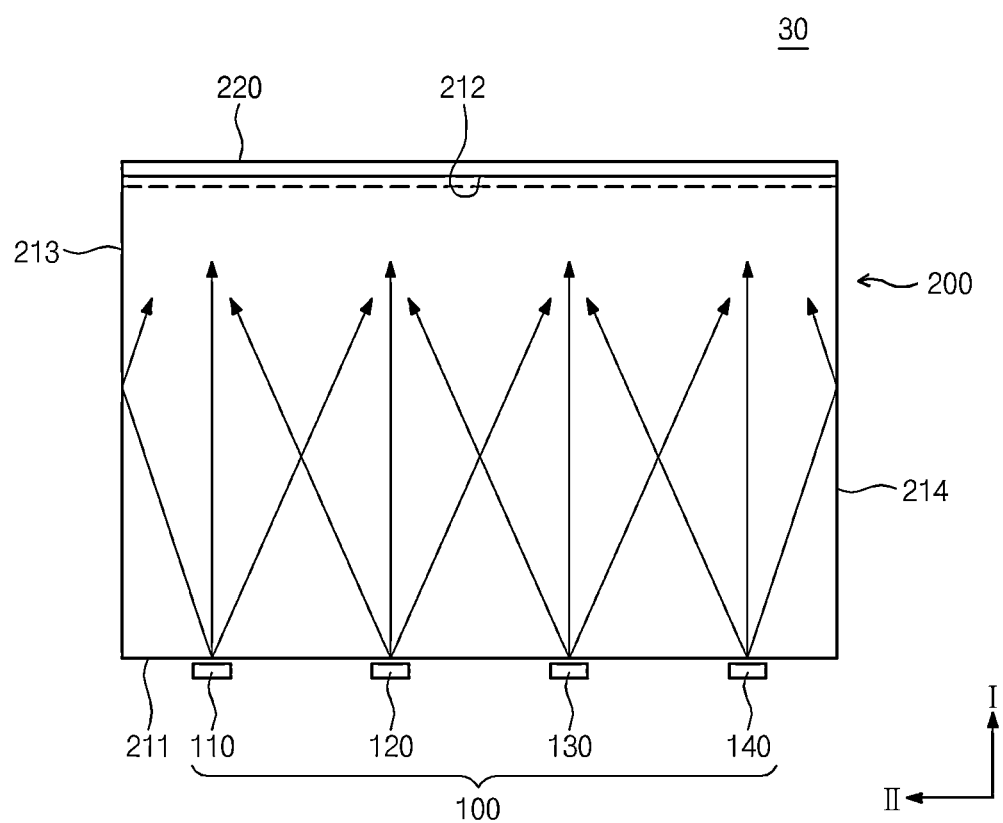
FIG. 3 is a plan view showing a backlight unit shown in FIG. 1.

FIG. 2 is a sectional view showing a backlight unit shown in FIG. 1, and FIG. 3 is a plan view showing a backlight unit shown in FIG. 1.

Referring to FIG. 2 and FIG. 3, the light guide plate 200 includes a body 210 and reflective prisms 220. The body 210 and the prisms 220 may include polymethyl methacrylate (PMMA) as an example, but is not limited thereto.

The body 210 may have a wedge-like shape in which a thickness thereof may become thicker with respect to a distance from the light source 100. In more detail, the body 210 includes an incident surface 211, an opposite surface 212, a first side surface 213, a second side surface 214, an upper surface 215, and a lower surface 216. The light may be incident to the light guide plate 200 through the incident surface 211. The incident surface 211 and the opposite surface 212 are spaced apart from each other in the first direction I and face each other. The incident surface 211 and the opposite surface 212 may have a convex shape in the first direction I. The first side surface and the second side surface may connect both sides of the incident surface 211 and both sides of the opposite surface 212. The upper surface 215 connects an upper edge of the incident surface 211 and an upper edge of the opposite surface 212 and is flat in the first direction I. The lower surface 216 connects a lower edge of the incident surface 211 and a lower edge of the opposite surface 212 and faces the upper surface 215. In addition, the lower surface 216 may be oriented at an angle with reference to the first direction I. A distance between the upper surface 215 and the lower surface 216 may gradually increases along the first direction I.

Although not illustrated, the incident surface 211 may be optionally alternated with a non-incident surface. For example, if the light guide plate includes openings corresponding to the light emitting diodes, a non-incident surface may be used in place of the incident surface 211.

The reflective prisms 220 are disposed on the opposite surface 212. The reflective prisms 220 may have a triangular cross-sectional shape. The reflective prisms 220 are extended in a lengthwise direction of the opposite surface 212 and arranged in a widthwise direction, which may be perpendicular to the lengthwise direction of the opposite surface 212. The lengthwise direction of the opposite surface 212 may be similar or substantially be the same as the second direction II, and the widthwise direction of the opposite surface 212 may be similar or substantially the same as the third direction III.

The light source 100 may be, but not limited to, a point light source, a linear light source, or a surface light source. The point light source will be described in more detail as the light source 100. The point light source may be a light emitting diode. The light source 100 may be provided in multiples, including, a first light source 110, a second light source 120, a third light source 130, and a fourth light source 140). The first light source 110, the second light source 120, the third light source 130, and the fourth light source 140 are arranged in the second direction II to be substantially parallel to the incident surface 211 of the light guide plate 200.

The first light source 110, the second light source 120, the third light source 130, and the fourth light source 140 may emit light to the incident surface 211 of the light guide plate 200. The lights may be emitted at a predetermined angle with reference to the first direction I. The lights may be incident to the incident surface 211 and travel toward the opposite surface 212 while being reflected between the upper surface 215 and the lower surface 216. Since the lower surface 216 may be oriented at an angle with respect to the upper surface 215, incident angles of the lights to the lower surface 216 and reflection angles of the lights from the lower surface 216 may become larger as the lights travel to the first direction I.

While the lights emitted from the light sources travel to the opposite surface 212 from the incident surface 211 (hereinafter, referred to as first stage), reflection of the lights repeatedly occurs. More specifically, during the first stage, the lights emitted from the light sources may be sufficiently mixed with each other without being leaked or minimal leakage through the upper surface 215 and the lower surface 216.

The lights traveling to the opposite surface 212 may be reflected by the reflective prisms 220. The lights reflected by the reflective prisms 220 may travel to the incident surface 211 by being reflected between the upper surface 215 and the lower surface 216 (hereinafter, referred to as second stage). Since the lower surface 216 may be oriented at an angle with respect to the upper surface 215, incident angles of the lights to the upper surface 215 and the lower surface 216, and reflection angles of the lights from the upper surface 215 and the lower surface 216 may become smaller as the lights travel to the opposite direction to the first direction I. If the incident angles become smaller than a reference angle, the lights may be refracted at the upper surface 215 and the lower surface 216. A portion, if not majority, of the lights may be refracted at the upper surface 215 to travel to the optical sheet 300. The lights exiting through the upper surface 215 may be emitted at an angle smaller than 90 degrees with respect to a normal line.

Referring back to FIG. 2, the optical sheet 300 includes a light polarizing prism sheet 320, a diffusion sheet 340, and a protective sheet 360. The light polarizing prism sheet 320 is disposed on the light guide plate 200. The light polarizing prism sheet 320 may change a direction in which the light exiting from the light guide plate 200, which may travel to the third direction III that is a substantially in a vertical direction with respect to the upper surface of the display panel 10. The diffusion sheet 340 is disposed on the light polarizing prism sheet 320. The diffusion sheet 340 may diffuse the light exiting from the light polarizing prism sheet to the first direction I and the opposite or different direction to the first direction I. The protective sheet 360 may be disposed on the diffusion sheet 340 to protect the diffusion sheet 340 from external impacts. The light diffused by the diffusion sheet 340 may pass through the protective sheet 360 and travel to the display panel 10.

In the second stage, some of the lights may be refracted at the lower surface 216 and leaked outside the light guide plate 200. The reflective sheet 400 may be disposed under the light guide plate 200. The reflective sheet 400 may reflect the light leaked through the lower surface 216 of the light guide plate 200 to the lower surface 216 of the light guide plate 200. The light reflected by the reflective sheet 400 may be incident to the lower surface 216 and refracted at the lower surface 216 to travel inside of the light guide plate 200. Thus, the amount of the light provided to the display panel 10 may be increased by the reflective sheet 400.

Figure 4A:
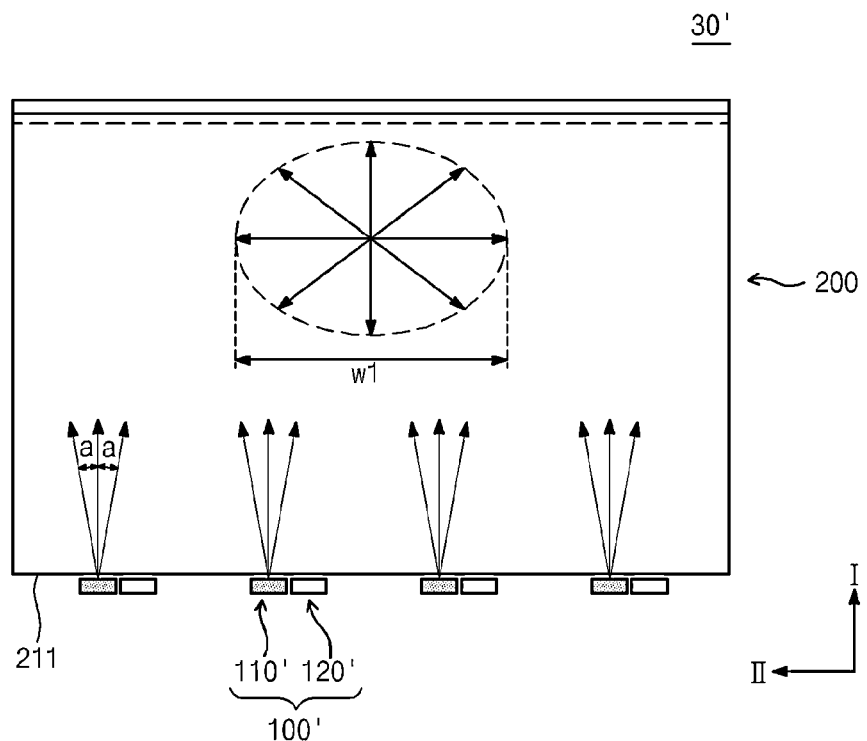
FIG. 4A and FIG. 4B are plan views showing a backlight unit according to an exemplary embodiment of the present invention.
Figure 4B:
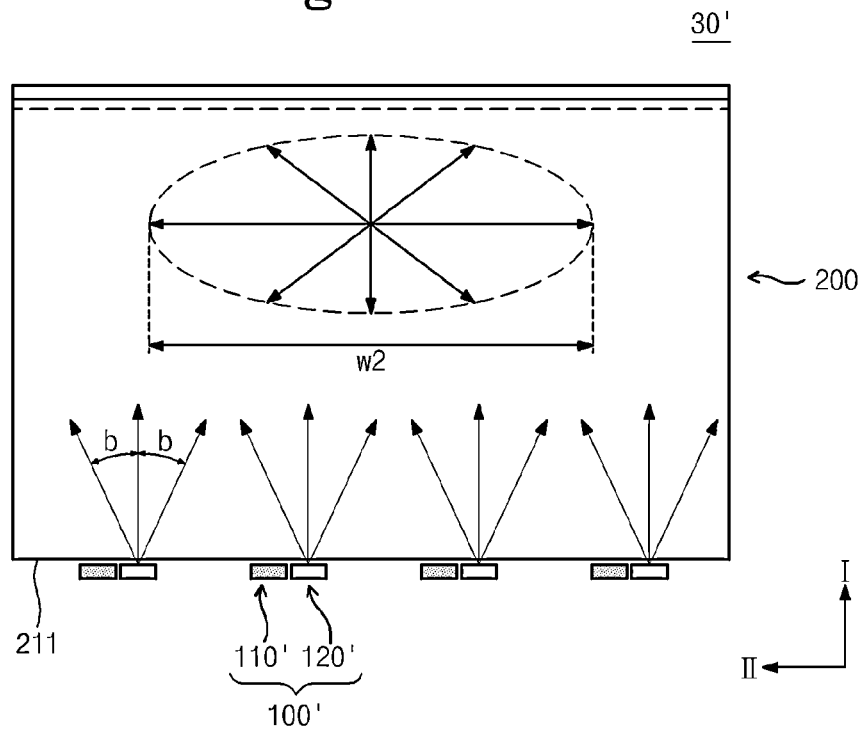

FIG. 4A and FIG. 4B are plan views showing a backlight unit 30' according to an exemplary embodiment of the present invention.

The backlight unit 30' shown in FIG. 4A and FIG. 4B has the same configuration and operation as those of the backlight unit 30 shown in FIG. 3 except for a light source 100' shown in FIG. 4A and FIG. 4B. Accordingly, hereinafter only the configuration of the light source 100' will be described in more detail.

For the convenience of explanation, the optical sheet 300 has been omitted in FIG. 4A and FIG. 4B, but the distribution of the light exiting from the optical sheet 300 has been shown.

The light exiting from the optical sheet 300 may have a distribution of a reversed conical shape.

The light source 100' includes first light sources 110' and second light sources 120'. The first light sources 110' are alternately arranged with the second light sources 120'. Further, the first light source 110' and the second light source 120' are arranged substantially parallel to the incident surface 211 of the light guide plate 200. Each of the first light sources 110' has a first emission angle (a) and each of the second light sources 120' has a second emission angle (b). The first emission angle (a) may be smaller than the second emission angle (b).

As shown in FIG. 4A, if the light is incident to the light guide plate 200 from the first light sources 110', the optical sheet 300 may output a light having a width W1 in the second direction II. In this case, the image displayed on the display panel 10 may be perceived in front of the display apparatus (hereinafter, referred to as a private mode). As shown in FIG. 4B, if the light is incident into the light guide plate 200 from the second light sources 120', the optical sheet 300 may output a light having a width W2, which may be larger than the width W1, in the second direction II. In this case, the image displayed on the display panel 10 may be perceived not only in front of the display apparatus but also in the side of the display apparatus (hereinafter, referred to as a public mode).

As described above, the backlight unit 30' may be operated in the private mode or the public mode by selectively utilizing the first light sources 110' or the second light sources 120'.

Figure 5A:
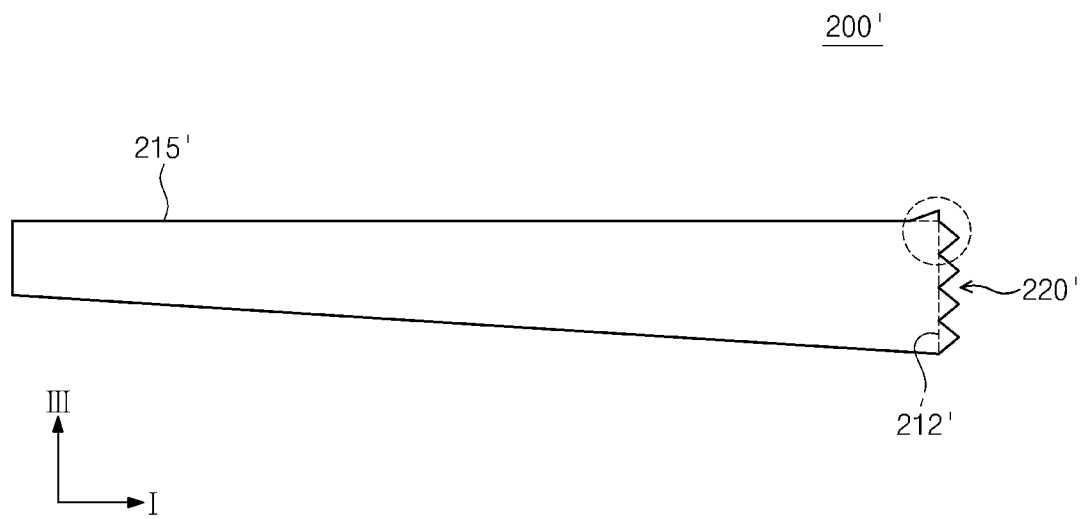
FIG. 5A is a sectional view showing a conventional light guide plate.
Figure 5B:
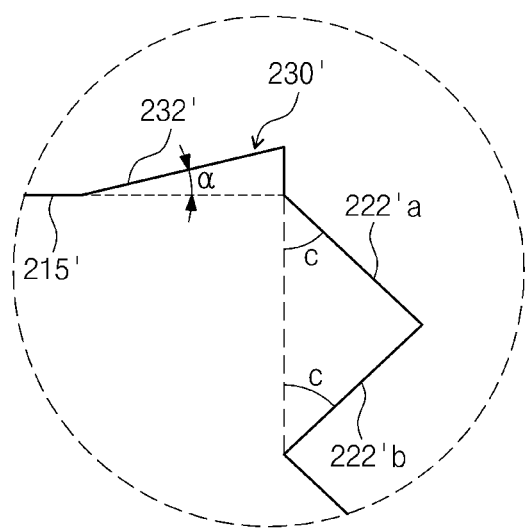
FIG. 5B is an enlarged view showing a portion A shown in FIG. 5A.

FIG. 5A is a sectional view showing a conventional light guide plate, and FIG. 5B is an enlarged view showing a portion A shown in FIG. 5A.

Referring to FIG. 5A and FIG. 5B, a light guide plate 200' has a wedge-like shape. Multiple reflective prisms 220' are disposed on an opposite surface of the light guide plate 200'. The reflective prisms 220' may have a triangular cross-sectional shape. First inclined surface 222'a and second inclined surface 222'b of each reflective prism may have the same base angle (c).

The light guide plate 200' may be manufactured by an injection molding process. During the injection molding process, the light guide plate 200' may be partially deformed by a cold process. In more detail, a defective portion 230', which may be partially deformed, is disposed at an edge of an upper surface 215', which is adjacent to the opposite surface 212'. The defective portion 230' may protrude upwardly from the upper surface 215' of the light guide plate 200' with reference to the first direction I and extended in the second direction II. The defective portion 230' includes an inclined surface 232' inclined at an angle α.

The defective portion 230' may distort the light incident into the reflective prisms 220' in the first stage and distort the light exiting from the light guide plate 200' in the second stage. Hereinafter, the distortion of the light, which may be caused by the defective portion 230', will be described.

Figure 6:
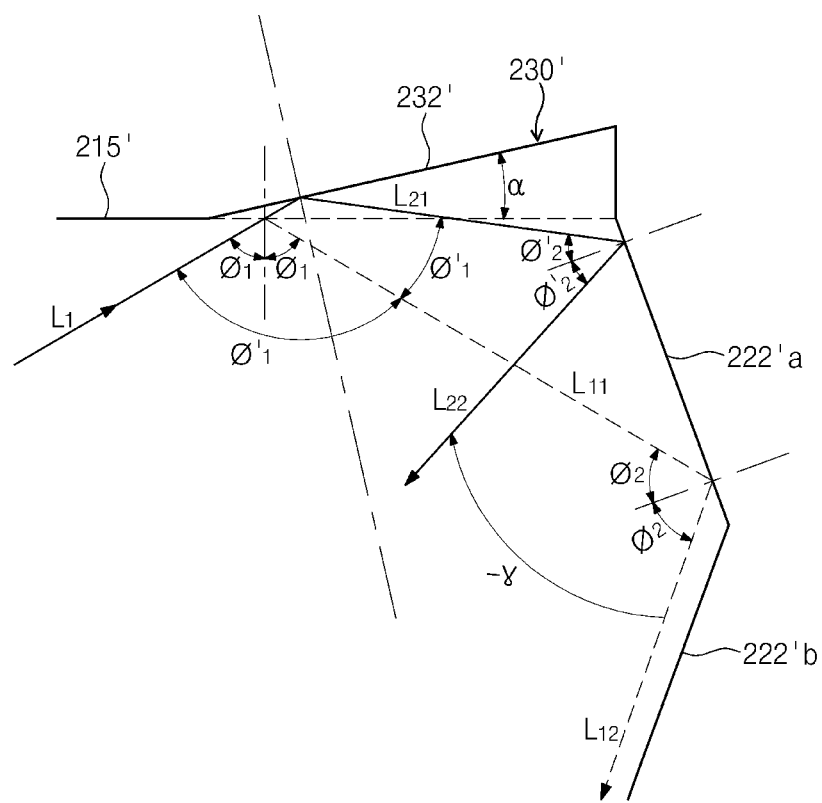
FIG. 6 and FIG. 7 are views showing a distortion of light due to a defective portion.
Figure 7:
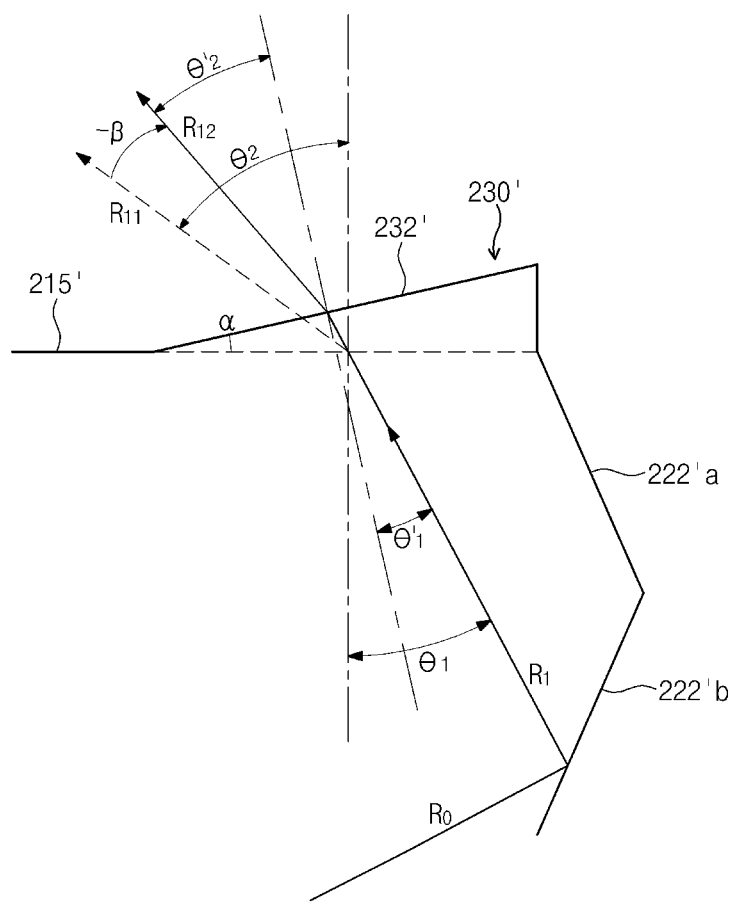
Figure 8:
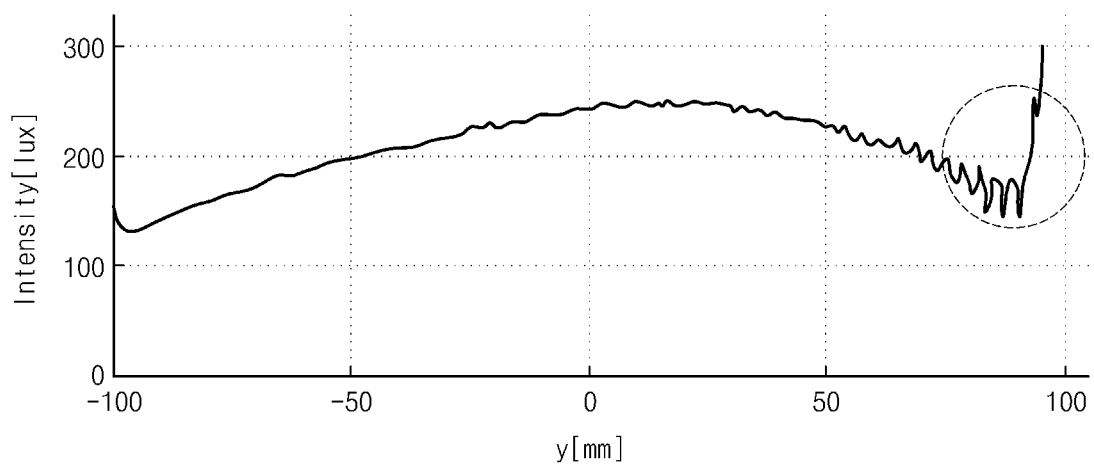
FIG. 8 is a graph showing a distribution of light emitted from a conventional light guide plate.
Figure 9:
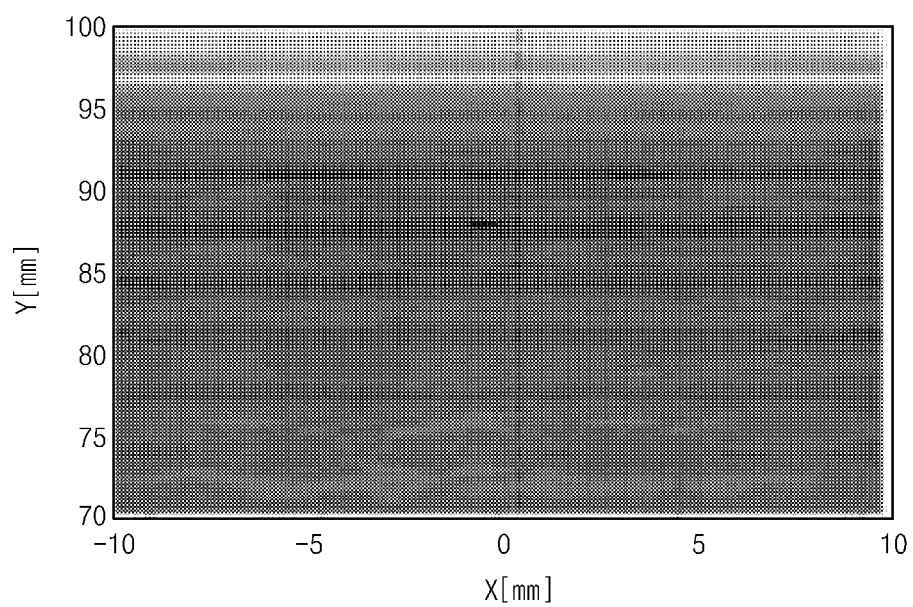
FIG. 9 is a view showing a horizontal dark line appearing on a conventional light guide plate.

FIG. 6 and FIG. 7 are views showing a distortion of light due to a defective portion. FIG. 8 is a graph showing a distribution of light emitted from a conventional light guide plate, and FIG. 9 is a view showing a horizontal dark line appearing on a conventional light guide plate.

Referring to FIG. 6, a light $L_1$ is incident to the upper surface 215' of the light guide plate 200' and a light $L_{11}$ is reflected by the upper surface 215'. The light $L_1$ has an incident angle $Ø_1$ equal to a reflection angle $Ø_1$ of the light $L_{11}$. The light $L_{11}$ is reflected by the first inclined surface 222'a of the reflective prism 220' and a light $L_{12}$ is reflected by the first inclined surface 222'a. The light $L_{11}$ has an incident angle $Ø_2$ equal to a reflection angle $Ø_2$ of the light $L_{12}$.

Different from the above, if the light $L_1$ is incident into the defective portion 230', the optical path of the light $L_1$ may become different. The light $L_1$ is incident to the inclined surface 232' of the defective portion 230' and a light $L_{21}$ is reflected by the inclined surface 232'. The light $L_1$ has an incident angle $Ø'_1$ equal to a reflection angle $Ø'_1$ of the light $L_{21}$. Since the inclined surface 232' is oriented at the angle α with respect to the upper surface 215', the incident angle $Ø'_1$ becomes larger than the incident angle $Ø_1$. The light $L_{21}$ is incident to the first inclined surface 222'a of the reflective prism and the light $L_{22}$ is reflected by the first inclined surface 222'a. The light $L_{21}$ has an incident angle $Ø'_2$ equal to a reflection angle $Ø'_2$ of the light $L_{22}$. Since the incident angle $Ø'_1$ becomes larger than the incident angle $Ø_1$, the incident angle $Ø'_2$ of the light $L_{21}$ may be smaller than the incident angle $Ø_2$ of the light $L_{11}$ with reference to the first inclined surface 222'a. Thus, the two of reflection angles $Ø'_2$ of the light $L_{22}$ may be smaller than the two reflection angles $Ø_2$ of the light $L_{12}$ by an angle γ with reference to the first inclined surface 222'a. In other words, the distortion of the reflection light occurs at the first inclined surface 222'a.

Referring to FIG. 7, a light $R_0$ is incident to the second inclined surface 222'b and a light $R_1$ is reflected by the second inclined surface 222'b. The light $R_1$ is incident to the upper surface 215' of the light guide plate and a light $R_{11}$ is refracted at the upper surface 215'. The light $R_1$ has an incident angle of $Θ_1$ with respect to the y-axis and a refraction angle of $Θ_2$ with respect to the y-axis.

Different from the above, if the light $R_1$ is incident into the defective portion 230', the optical path of the light $R_1$ becomes different. If the light $R_1$ is incident to the inclined surface 230', a light $R_{12}$ is reflected by the inclined surface 232'. The incident angle of the light R1 is $Θ'_1$ with respect to an axis perpendicular to the inclined surface 232' and the refraction angle of the light R12 is $Θ'_2$ with respect to the axis perpendicular to the inclined surface 232'. Since the inclined surface 232' is inclined upwardly at the angle α with respect to the upper surface 215', the incident angle $Θ'_1$ of the light $R_1$ may be smaller than the incident angle $Θ_1$ of the light $R_1$. If the incident angle $Θ'_1$ is smaller than the incident angle $Θ_1$, the refraction angle $Θ'_2$ of the light $R_{12}$ may be smaller than the refraction angle $Θ_2$ of the light $R_{11}$. Accordingly, the light $R_{12}$ may be refracted at a smaller angle than that of the light $R_{11}$ by an angle of β or more. That is, the distortion of the refracted light occurs at the inclined surface 232' of the defective portion 230'.

If the distortion of the light occurs by the defective portion 230', the distribution of intensities of the emitted light may become non-uniform as shown in FIG. 8 and a horizontal dark line may appear in an area in which the intensity of the light decrease beyond a reference threshold as shown in FIG. 9.

Figure 10:
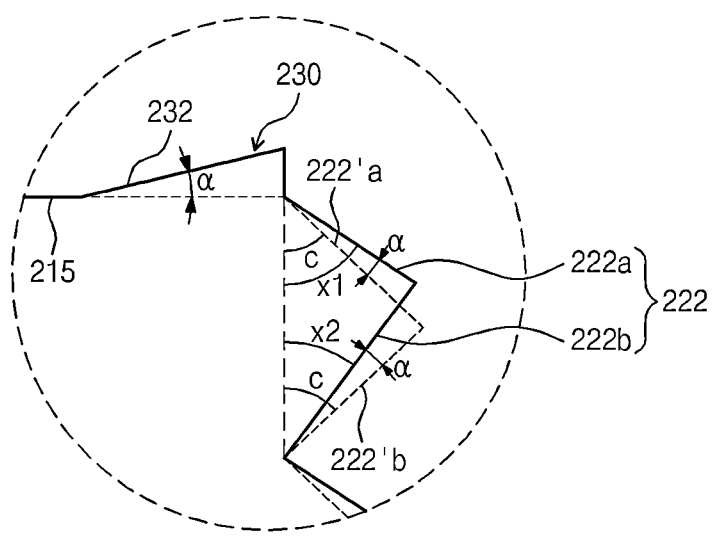
FIG. 10 is a view showing a portion of a light guide plate according to an exemplary embodiment of the present invention.

FIG. 10 is a view showing a portion of a light guide plate according to an exemplary embodiment of the present invention.

For the convenience of explanation, the first inclined surface 222'a and the second inclined surface 222'b of the conventional light guide plate 200' have been shown in FIG. 10. The first inclined surface 222'a and the second inclined surface 222'b have the same base angle (c).

Referring to FIG. 10, the reflective prisms 220 of the light guide plate include upper reflective prisms 222 disposed in an upper area of the opposite surface 212.

Each of the upper reflective prisms 222 includes an upper inclined surface 222a and a lower inclined surface 222b disposed below the upper inclined surface. An upper base angle X1 between the upper inclined surface 222a and the opposite surface 212 may have a triangular cross-sectional shape different from that of a lower base angle X2 between the lower inclined surface 222b and the opposite surface 212. In more detail, the upper inclined surface 222a may have the upper base angle X1 increased by the angle α of the defective portion 230 with reference to the first inclined surface 222'a. The lower inclined surface 222b may have the lower base angle X2 decreased by the angle α of the defective portion 230 with reference to the second inclined surface 222'b. In this case, the upper area may be an area disposed adjacent to the upper surface 215 with reference to an imaginary line connecting points positioned at ½ positions of the distance between the upper surface 215 and the lower surface 216.

Figure 11A:
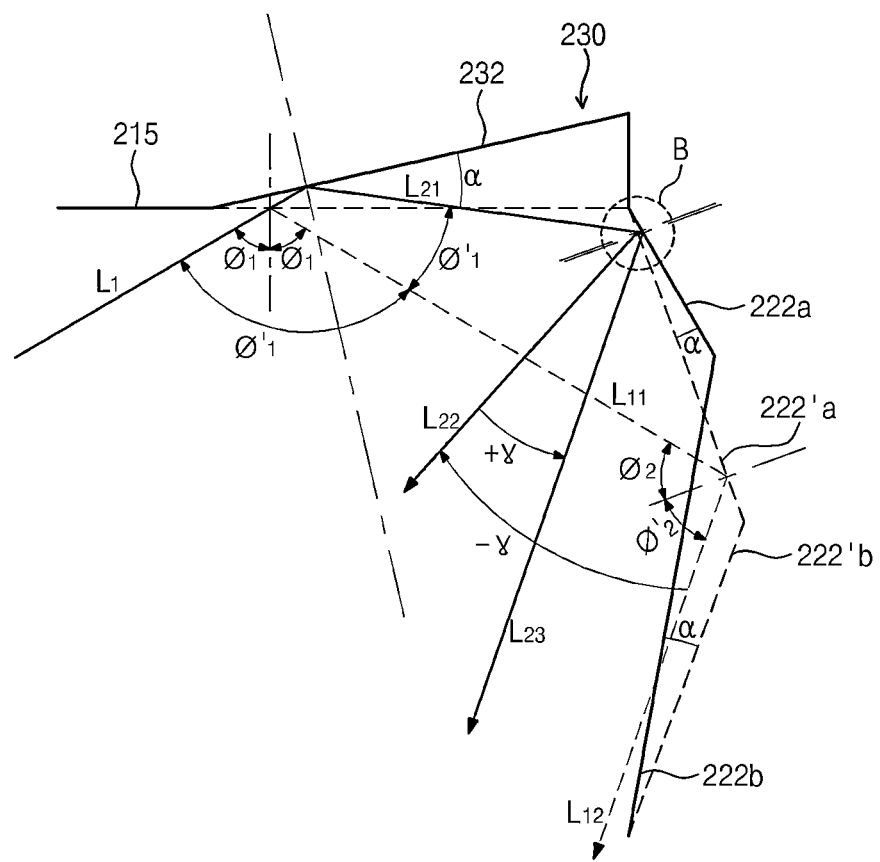
FIG. 11A, FIG. 11B, and FIG. 12 are views showing a light compensated by using a reflective prism according to an exemplary embodiment of the present invention.
Figure 11B:
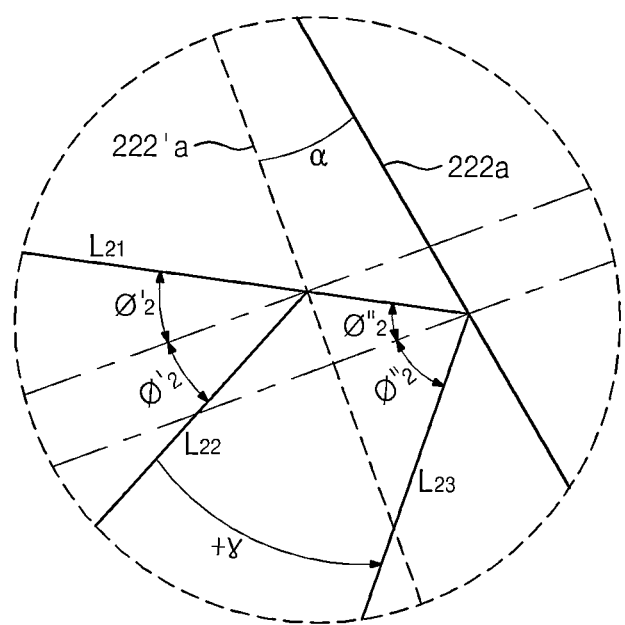
Figure 12:
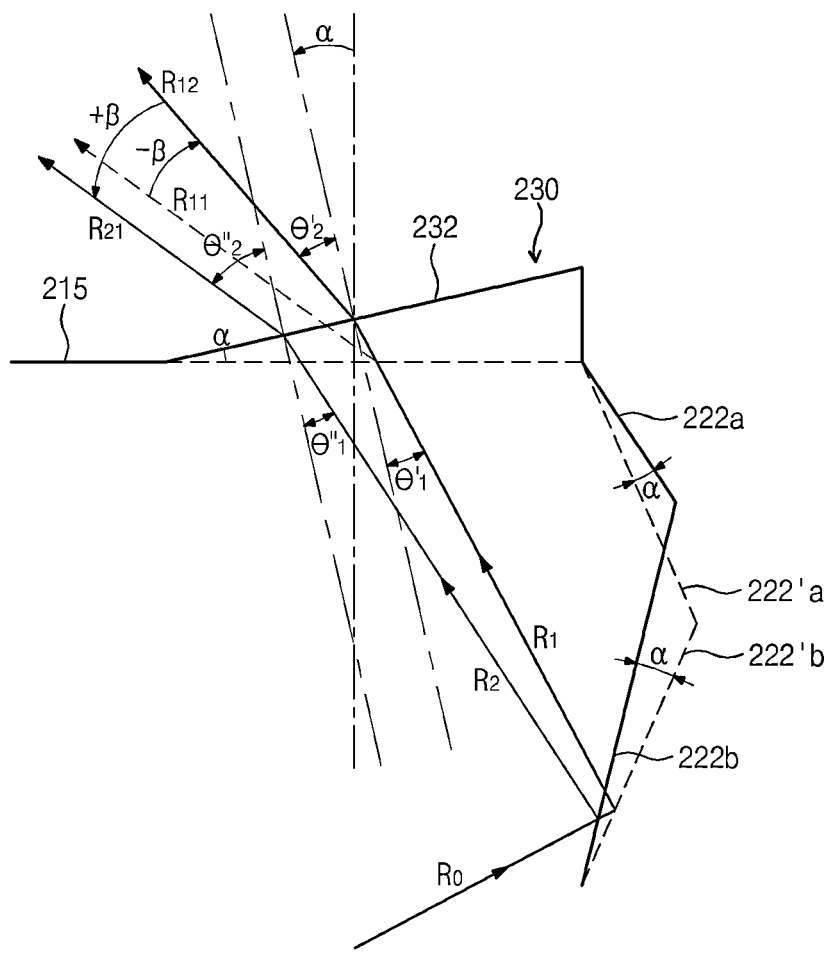
Figure 13:
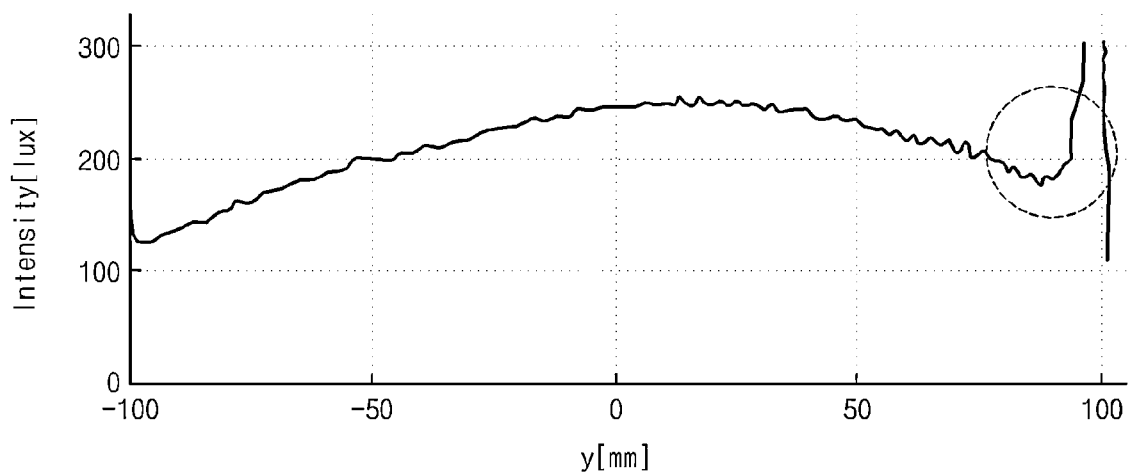
FIG. 13 is a graph showing a distribution of light emitted from a light guide plate according to an exemplary embodiment of the present invention.
Figure 14:
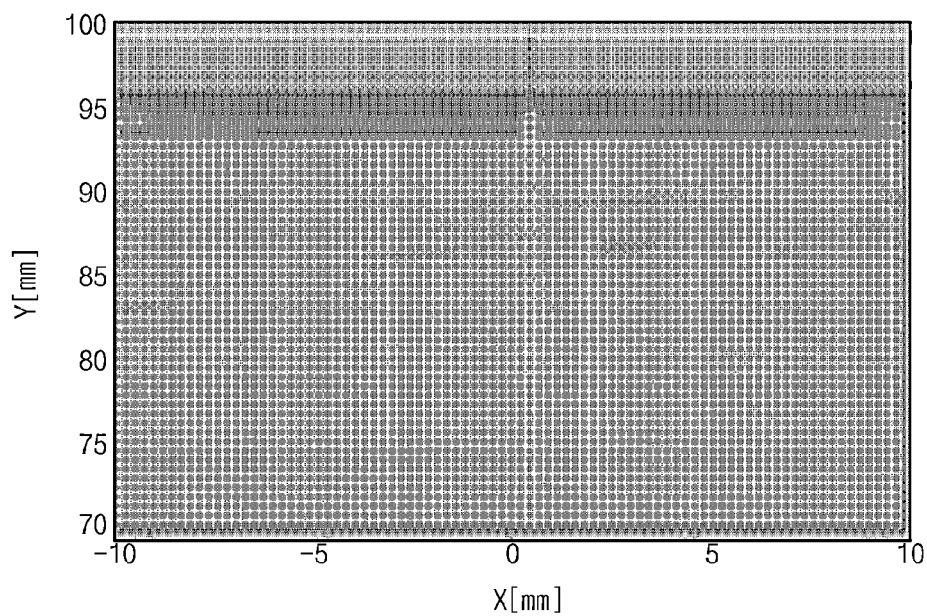
FIG. 14 is a view showing the light guide plate from which a horizontal dark line is removed according to an exemplary embodiment of the present invention.

FIG. 11A, FIG. 11B, and FIG. 12 are views showing a light compensated by using a reflective prism according to an exemplary embodiment of the present invention. FIG. 13 is a graph showing a distribution of light emitted from a light guide plate according to an exemplary embodiment of the present invention. FIG. 14 is a view showing the light guide plate from which a horizontal dark line is removed according to an exemplary embodiment of the present invention.

Referring to FIG. 11A and FIG. 11B, a light L21 is incident to the upper inclined surface 222a and a light $L_{23}$ is reflected by the upper inclined surface 222a. The light $L_{21}$ has an incident angle $\varnothing''_2$ that is the same as a reflection angle $\varnothing''_2$ of the light $L_{23}$. Since the upper inclined surface 222a has the base angle increased by the angle α with respect to the first inclined surface 222'a, the incident angle $\varnothing''_2$ of the light $L_{21}$ with respect to the upper inclined surface 222a becomes larger than the incident angle $\varnothing'_2$ of the light $L_{21}$ with respect to the first inclined surface 222'a. If the incident angle $\varnothing''_2$ becomes larger than the incident angle $\varnothing'_2$, the reflection angle $\varnothing''_2$ of the light $L_{23}$ with respect to the upper inclined surface 222a may become larger than the reflection angle $\varnothing'_2$ of the light $L_{22}$ with respect to the first inclined surface 222'a by an angle γ. Thus, the reflection light $L_{22}$ distorted by the defective portion 230 may be compensated, at least in part, by the light $L_{23}$. The angle of the inclined surface 232 of the defective portion 230, which may be able to compensate for the reflection light $L_{22}$, may be in a range of about zero to five degrees.

Referring to FIG. 12, a light $R_0$ is incident to the lower inclined surface 222b and a light $R_2$ is reflected by the lower inclined surface 222b. The light $R_2$ is incident to the inclined surface 232 and refracted at the inclined surface 232. An incident angle of the $R_2$ with respect to an axis perpendicular to the inclined surface 232 is $\varnothing''_1$ and a refraction angle of a light $R_{21}$ with respect to the axis perpendicular to the inclined surface 232 is $\varnothing''_2$. Since the lower inclined surface 222b has the base angle decreased by the angle α with respect to the second inclined surface 222'b, the incident angle $\varnothing''_1$ of the light $R_2$ with respect to the axis perpendicular to the inclined surface 232 of the defective portion 230 may become larger than the incident angle $\varnothing'_1$ of the light $R_1$ with respect to an axis perpendicular to the inclined surface 232 of the defective portion 230. If the incident angle $\varnothing''_1$ becomes larger than the incident angle $\varnothing'_1$, the refraction angle $\varnothing''_2$ of the light $R_{21}$ with respect to the inclined surface 232 may become larger than the refraction angle $\varnothing'_2$ of the light $R_{12}$ with respect to the inclined surface 232. Thus, the light $R_{21}$ may be refracted at a larger angle than that of the light $R_{12}$ by an angle of ↑. As a result, the refraction light $R_{12}$ distorted by the defective portion 230 may be compensated, at least in part, by the refraction light $R_{21}$. Further, the angle of the inclined surface 232 of the defective portion 230, which may be able to compensate for the refraction light $R_{12}$, may be in a range of about zero to five degrees.

If the light distorted by the defective portion 230 is compensated by the upper reflective prisms 222, the intensity distribution of the emitted light may become more uniform as shown in FIG. 13 and a likelihood of the horizontal dark line occurring may be reduced or prevented as shown in FIG. 14.

Hereinafter, various light guide plates according to exemplary embodiments will be described in detail. In FIG. 15, FIG. 16, FIG. 17 and FIG. 18, the same reference numerals denote the same elements in FIG. 10, and thus detailed descriptions of the same elements will be omitted.

Figure 15:
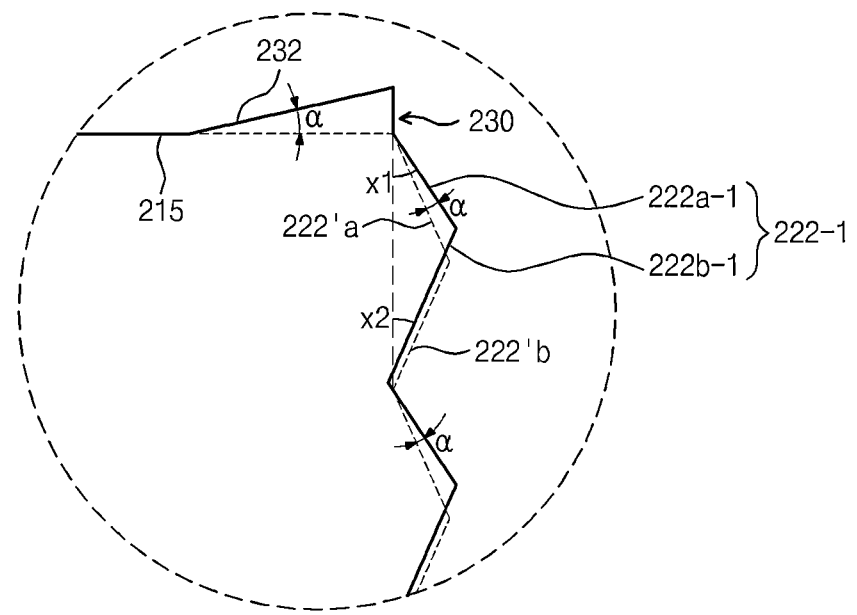
FIG. 15 is a view showing a portion of a light guide plate according to an exemplary embodiment of the present invention.

FIG. 15 is a view showing a portion of a light guide plate according to an exemplary embodiment of the present invention.

Referring to FIG. 15, upper reflective prisms 222-1 disposed in the upper area of the opposite surface may have a triangular cross-sectional shape. In more detail, an upper inclined surface 222a-1 may be inclined to have an upper base angle X1 increased by the angle α of the defective portion 230 with reference to the first inclined surface 222'a. A lower inclined surface 222b-1 has a lower base angle X2 equal to that of the second inclined surface 222'b.

Figure 16:
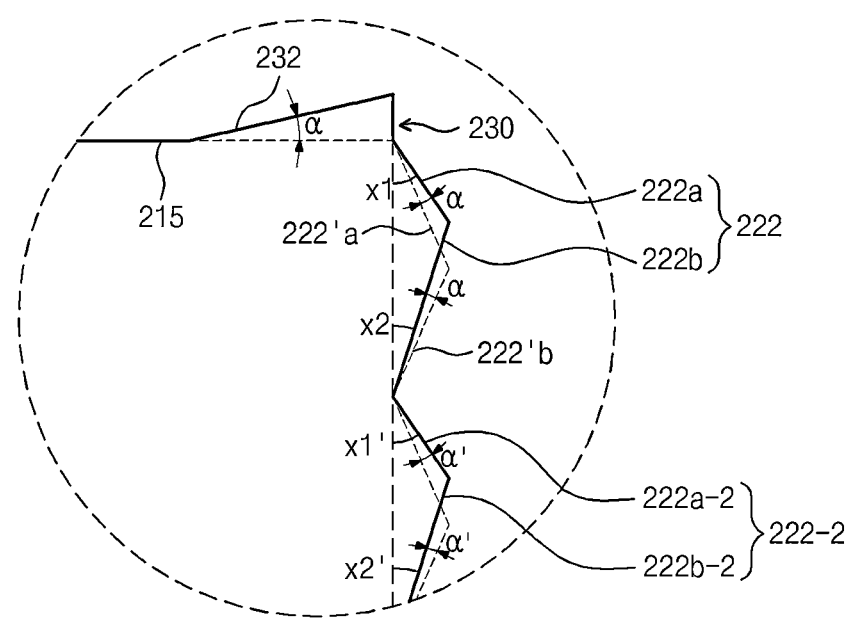
FIG. 16 is a view showing a portion of a light guide plate according to an exemplary embodiment of the present invention.

FIG. 16 is a view showing a portion of a light guide plate according to an exemplary embodiment of the present invention.

Referring to FIG. 16, an upper reflective prism 222 and an upper reflective prism 222-2 have different upper base angles X1 and X1' from each other and different lower base angles X2 and X2' from each other.

Among the upper reflective prisms 220, the upper reflective prism 222 disposed at the uppermost position has the triangular cross-sectional shape. In particular, the upper inclined surface 222a may be inclined to have an upper base angle X1 increased by the angle α of the defective portion 230 with reference to a first inclined surface 222'a. The lower inclined surface 222b may be inclined to have a lower base angle X2 decreased by the angle α of the defective portion 230 with reference to a second inclined surface 222'b. The upper reflective prism 222, the upper inclined surface 222a, and the lower reflective prism 222b may be referred to as a first upper reflective prism, a first upper inclined surface, and a first lower inclined surface, respectively.

A first upper reflective prism 222-2 disposed below the upper reflective prism 222 has the triangular cross-sectional shape. In more detail, a second upper inclined surface 222a-2 is inclined to have an upper base angle X1' increased by an angle α', which may be smaller than the angle α, of the defective portion 230 with reference to the first inclined surface 222'a. A second lower inclined surface 222b-2 is inclined to have a lower base angle X2' decreased by the angle α' smaller than the angle α of the defective portion 230 with reference to the second inclined surface 222'b.

Figure 17:
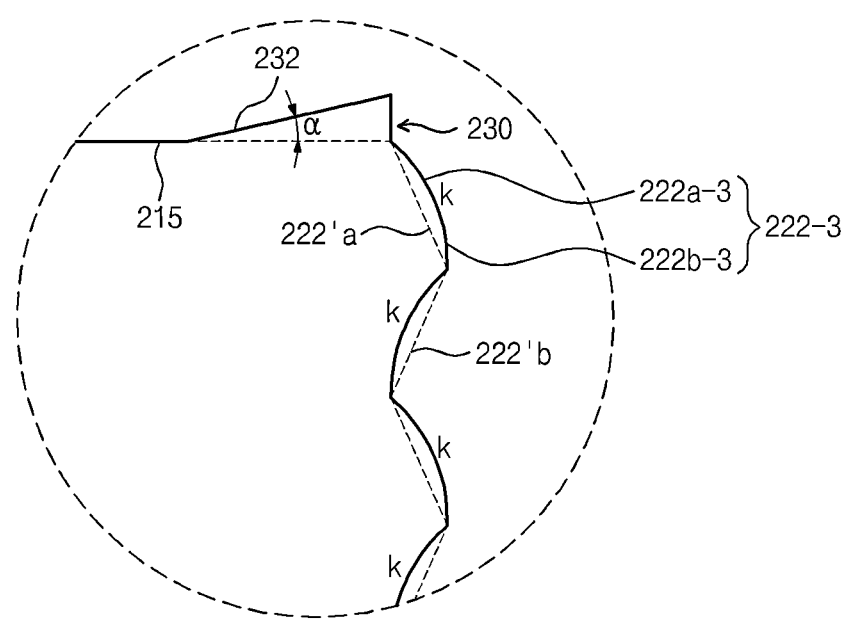
FIG. 17 is a view showing a portion of a light guide plate according to an exemplary embodiment of the present invention.

FIG. 17 is a view showing a portion of a light guide plate according to an exemplary embodiment of the present invention.

Referring to FIG. 17, a third upper reflective prisms 222-3 disposed in the upper area may have a substantially triangular cross-sectional shape. In more detail, a third upper inclined surface 222a-3 may have a convex curved shape in a direction of the upper base angle increase, and a third lower inclined surface 222b-3 may have a concave curved shape to a direction of the lower base angle decrease. The third upper inclined surface 222a-3 and the third lower inclined surface 222b-3 may have the same curvature k.

Figure 18:
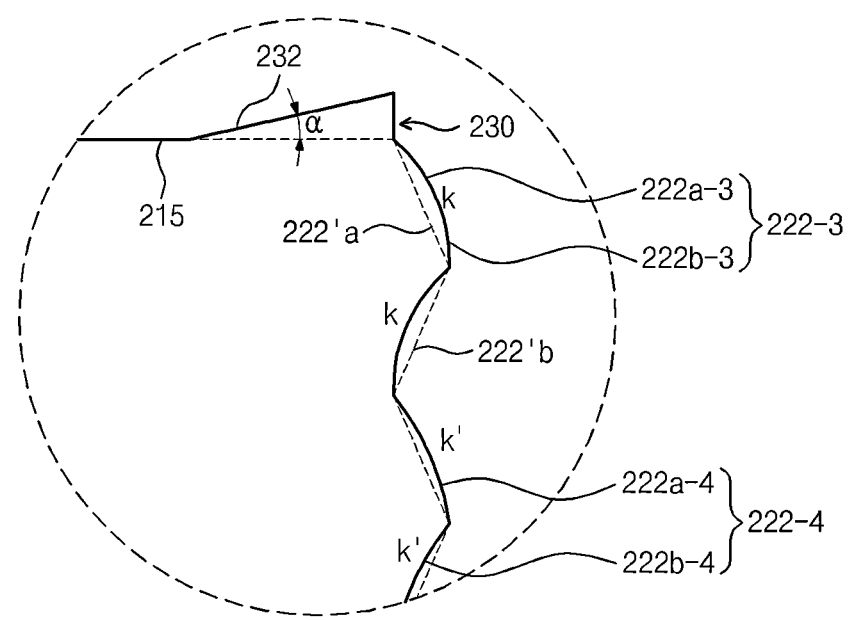
FIG. 18 is a view showing a portion of a light guide plate according to an exemplary embodiment of the present invention.

FIG. 18 is a view showing a portion of a light guide plate according to an exemplary embodiment of the present invention.

Referring to FIG. 18, the third upper inclined surface 222a-3 and a fourth upper inclined surface 222a-4 of the third upper reflective prisms 222-3 and a fourth upper reflective prism 222-4, respectively, have different curvatures from each other and the third lower inclined surface 222b-3 and a fourth lower inclined surface 222b-4 have different curvatures from each other. The third upper reflective prism 222-3 disposed at the uppermost position in the upper area includes the third upper inclined surface 222a-3 and the third lower inclined surface 222b-3 in the curved shape. The curvature of the third upper inclined surface 222a-3 and the third lower inclined surface 222b-3 may be k. The fourth upper reflective prism 222-4 disposed below the third upper reflective prism 222-3 includes the fourth upper inclined surface 222a-4 and the fourth lower inclined surface 222b-4 in the curved shape. The curvature of the fourth upper inclined surface 222a-4 and the fourth lower inclined surface 222b-4 may be k' different from k.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light guide plate, comprising:
a body comprising a first surface to which a light emitted from a light source is incident, an opposite surface facing the first surface, an upper surface configured to output the light, and a lower surface facing the upper surface; and
a plurality of prisms disposed on the opposite surface, wherein the light source faces the first surface, and
wherein the prisms comprise an upper inclined surface and a lower inclined surface disposed below the upper inclined surface, the prisms comprise upper prisms, the upper prisms comprising a triangular cross-sectional shape of which an upper base angle between the upper inclined surface and the opposite surface is different from a lower base angle between the lower inclined surface and the opposite surface.

2. The light guide plate of claim 1, further comprising a protruding portion disposed at an edge of the upper surface, wherein the upper inclined surface is inclined in a direction the upper base angle increases by an inclined angle of the protruding portion.

3. The light guide plate of claim 2, wherein the lower inclined surface is inclined in a direction the lower base angle decreases by the inclined angle of the protruding portion.

4. The light guide plate of claim 1, wherein the upper prisms comprise different upper base angles from each other and different lower base angles from each other.

5. The light guide plate of claim 4, wherein a first upper prism is disposed adjacent to the upper surface, and a second upper prism is disposed adjacently below the first upper prism.

6. The light guide plate of claim 1, wherein the upper inclined surface has a convex curved shape, and the lower inclined surface has a concave curved shape.

7. The light guide plate of claim 5, wherein the prisms have different curvatures from each other in the upper inclined surface and different curvatures from each other in the lower inclined surface.

8. The light guide plate of claim 1, wherein the protruding portion protrudes upwardly from the upper surface.

9. The light guide plate of claim 8, wherein the protruding portion comprises an inclined angle in a range of zero to five degrees.

10. The light guide plate of claim 1, wherein a distance between the upper surface and the lower surface increases from the first surface to the opposite surface.

11. The light guide plate of claim 1, wherein the first surface and the opposite surface comprise convex curved shapes.

12. A display apparatus, comprising:
a light source configured to emit a light;
a light guide plate configured to guide the light; and
a display panel configured to receive the light from the light guide plate to display an image, the light guide plate comprising:
a body comprising a first surface to which a light emitted from a light source is incident, an opposite surface facing the first surface, an upper surface configured to output the light, and a lower surface facing the upper surface; and
a plurality of prisms disposed on the opposite surface, wherein the light source faces the first surface, and
wherein the prisms comprise an upper inclined surface facing the upper surface and a lower inclined surface facing the lower surface, the prisms comprise upper prisms each of the upper prisms comprising a triangular cross-sectional shape of which an upper base angle between the upper inclined surface and the opposite surface is different from a lower base angle between the lower inclined surface and the opposite surface.

13. The display apparatus of claim 12, wherein the light source comprises:
a first light source comprising a first emission angle; and
a second light source comprising a second emission angle, wherein the first light source and the second light source are alternately arranged with each other and disposed in parallel to the first surface of the light guide plate.

14. The display apparatus of claim 12, further comprising:
a light polarizing prism sheet disposed on the light guide plate and configured to allow the light exiting from the light guide plate to travel in a direction vertical to an upper surface of the light guide plate; and
a diffusion sheet disposed on the light polarizing sheet and configured to diffuse the light exiting the light polarizing prism sheet.

15. The display apparatus of claim 12, wherein further comprising a protruding portion disposed at an edge of the upper surface, adjacent to the opposite surface and protruded upwardly from the upper surface.

16. The display apparatus of claim 15, wherein the protruding portion comprises an inclined angle in a range of zero to five degrees.

17. The display apparatus of claim 15, wherein the upper inclined surface is declined in a direction the upper base angle decreases to change an optical path of the light traveling between an inclined surface of the protruding portion and the upper inclined surface, and the lower inclined surface is inclined in a direction the lower base angle increases to change an optical path of the light traveling between the inclined surface of the protruding portion and the lower inclined surface.

18. The display apparatus of claim 15, wherein the upper inclined surface is inclined in a direction the upper base angle increases by an inclined angle of the protruding portion, and the lower inclined surface is inclined in a direction in which the lower base angle decreases by the inclined angle of the protruding portion.

19. The display apparatus of claim 15, wherein the upper inclined surface is inclined in a direction the upper base angle increases by an inclined angle of the protruding portion.

20. The display apparatus of claim 12, wherein a first upper prism is disposed adjacent to the upper surface, and a second upper prism is disposed adjacently below the first upper prism.

21. The display apparatus of claim 12, wherein the upper inclined surface has a convex curved shape, and the lower inclined surface has a concave curved shape.

22. The display apparatus of claim 21, wherein the prisms have different curvatures from each other in the upper inclined surface and different curvatures from each other in the lower inclined surface.

* * * * *